INVENTOR.
JAMES D. BRYAN
BY Billy G. Corber

United States Patent Office 2,971,188
Patented Feb. 7, 1961

2,971,188

RADAR NAVIGATION BEACON

James David Bryan, Baltimore, Md., assignor to Aircraft Armaments, Inc., Baltimore, Md., a corporation of Ohio Filed July 1, 1953, Ser. No. 365,439

8 Claims. (Cl. 343—6.8)

This invention relates in general to beacons and more particularly to a microwave radar navigation beacon for automatically transmitting information in the form of a coded signal in response to interrogating pulses from navigation type radars.

An object of this invention is to provide a completely automatic radar navigation beacon capable of unattended operation whereby the beacon may be employed in any desired remote location without the need for operating personnel.

Another object of this invention is to provide a radar navigation beacon which may be packaged as a small lightweight unit suitable for dropping from aircraft.

Another object of this invention is to provide a battery-powered radar navigation beacon which operates efficiently and dependably under varied and extreme climatic conditions and which possesses a long operating life by virtue of receiver automatic gain control and power control switching circuits employed for reducing the power drain while maintaining a maximum communication range.

Further and other objects will become apparent from a reading of the following description when taken in combination with the accompanying drawing wherein like numerals refer to like parts.

Figure 1:
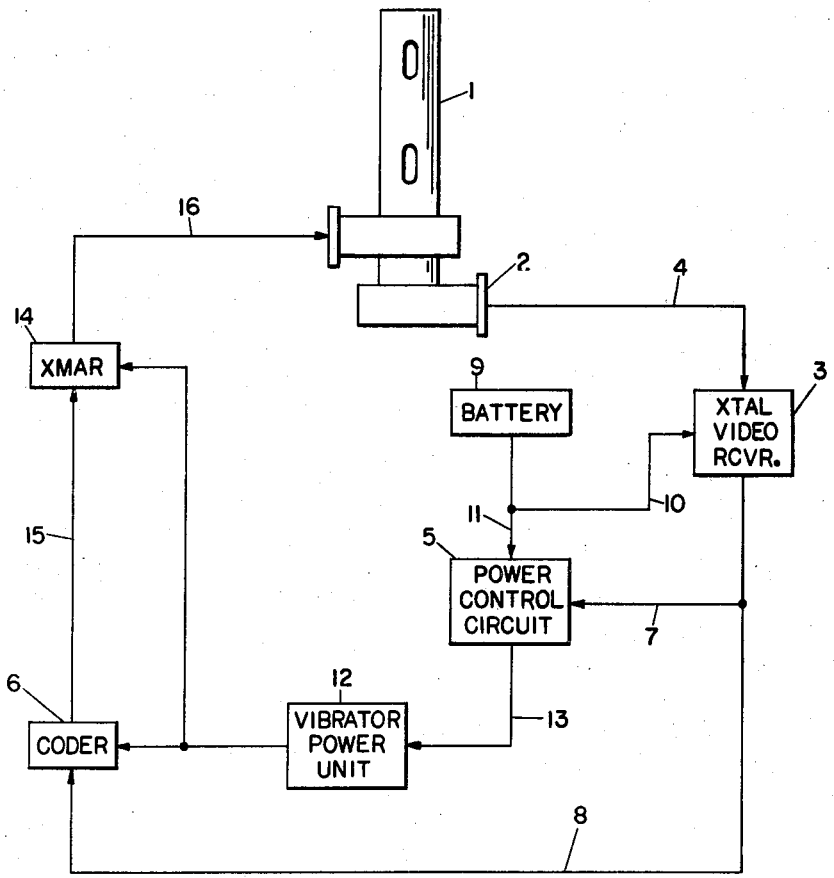
Figure 1 is a schematic block diagram of the navigation beacon circuit of this invention.

As shown in Figure 1 the beacon includes a combination transmitting and receiving antenna 1 having an outlet 2 formed at the lower end thereof for extracting the received interrogating pulses which are applied to a crystal video receiver 3 through line 4. Trigger pulses produced by receiver 3 in response to interrogating pulses are applied to a power control circuit 5 and a signal generator or coder 6 through leads 7 and 8 respectively for producing the desired output code signal.

A battery power supply 9 having a D.C. output is connected to receiver 3 through lead 10 and to power control circuit 5 through lead 11 so that power is applied to the receiver and power control circuit at all times. As hereinafter described in detail, power control circuit 5, in response to a trigger pulse from receiver 3, completes a circuit to a vibrator power unit 12 from battery 9 through lead 13. The vibrator power unit 12 generates the necessary voltages for operating coder 6 and beacon transmitter 14. The simultaneous application of the operating voltage from power unit 12 and a trigger pulse from receiver 3 causes coder 6 to produce the desired code signal. The coder output is applied to transmitter 14 through lead 15. The coded output from transmitter 14 is fed to antenna 1 through line 16. The energy is then radiated outwardly in all directions by the antenna in response to an interrogating pulse to provide, for example, information concerning the beacon location.

Since the construction and operation of the vibrator power unit, coder and transmitter are conventional and well known to those skilled in the art, a detailed description of these individual components will be omitted.

Figure 2:
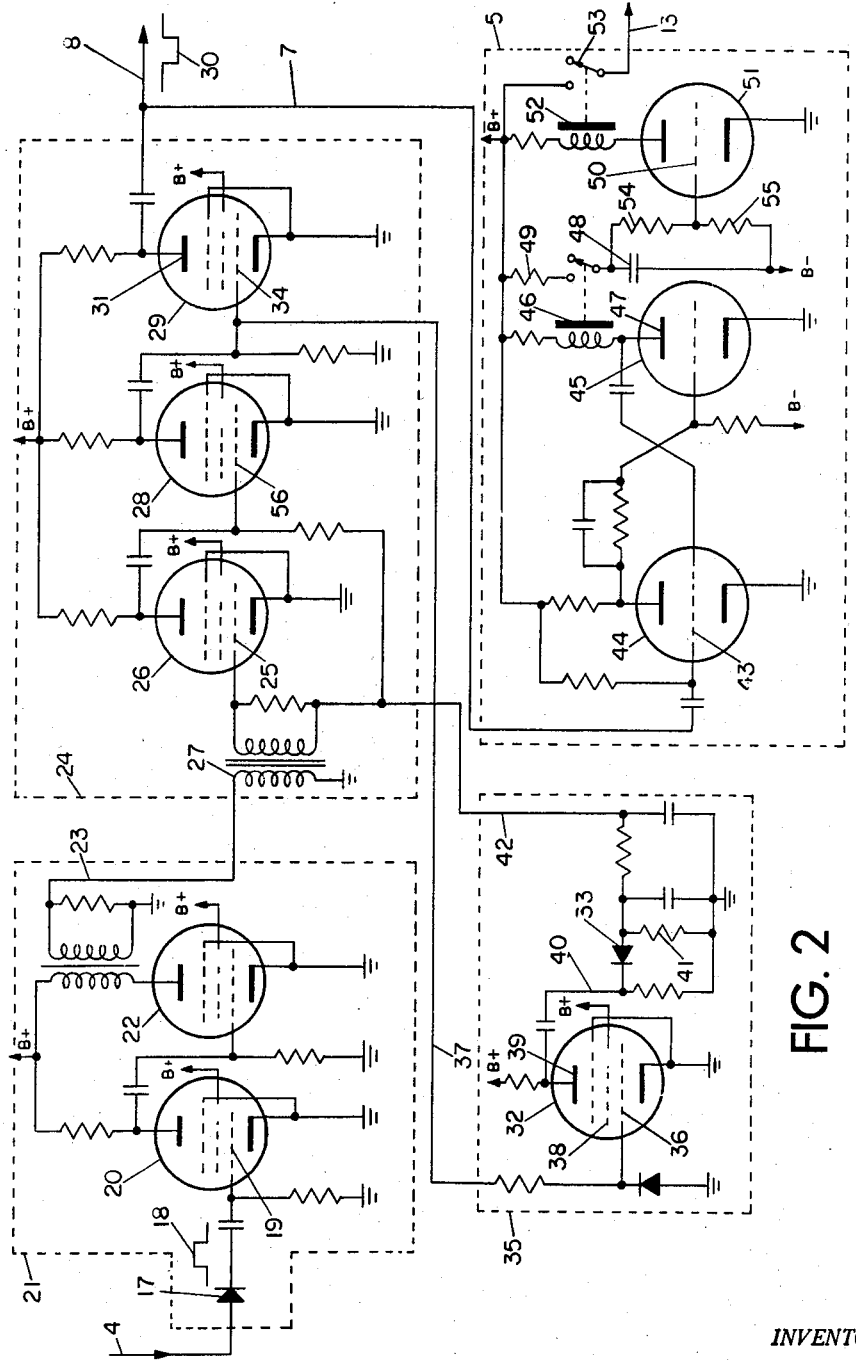
Figure 2 is a detailed schematic circuit diagram of the receiver and power control circuit shown in Figure 1.

A detail schematic of crystal video receiver 3 and power control circuit 5 is shown in Figure 2. The interrogating pulses received by antenna 1 are applied to a receiver crystal detector 17 through line 4. Positive video pulses 18 are thereby produced as the output of crystal detector 17 which are applied directly to the grid 19 of a pentode vacuum tube 20, the first stage of a conventional two stage video pre-amplifier 21. The second stage, a pentode vacuum tube 22, has a transformer output which is fed to a three stage video post amplifier 24 through lead 23. In post amplifier 24, video from the pre-amplifier appears at grid 25 of tube 26 through a step-up transformer 27 connecting with output 23 and is amplified in tubes 26, 28 and 29. Negative video trigger pulses 30 are obtained from plate 31 of tube 29, the last post amplifier stage. Trigger pulses 30 are applied to coder 6 through lead 8 and to power control circuit 5 through lead 7.

Temperature changes cause large variations in the video impedance of receiver crystal 17 which produces correspondingly large variations in the average noise level at the output of the receiver when a fixed gain setting is employed. Since the receiver output actuates the power control circuit and the coder by a trigger pulse voltage produced when tube 29 conducts, it is essential that the noise level be held below the critical voltage at which the tube operates in order to prevent inadvertent beacon operation. Therefore, an automatic gain control circuit 35 is employed in the receiver as shown in Figure 2 which compensates for temperature variations and other factors affecting the receiver noise output by changing receiver gain to give a constant noise level at tube 29 just below the critical voltage. Thus the maximum allowable receiver gain and hence maximum efficiency is automatically obtained for all operating conditions. The automatic gain control circuit includes a pentode vacuum tube 32, serving as an amplifier video limiter, and a detector 33. Positive noise and video appearing at grid 34 of tube 29 in the post-amplifier is applied to the grid 36 of tube 32 through lead 37, where video is limited at a value slightly greater than noise. The screen grid 38 of tube 32 is connected to B+ to maintain a constant noise base-line level at plate 39 and also to prevent prolonged overshoot due to grid limiting action. Noise appears amplified and inverted on plate 39 of tube 32 and at the input 40 to detector 33. The detector has a time constant due to the condenser-resistor network 41 such that it responds only to the low frequency components of noise and gives a D.C. output the magnitude of which is proportional to the average noise level. The detector output is applied to grids 25 and 56 through lead 42, providing bias for tubes 26 and 28, the first two stages of the receiver post-amplifier. Signal polarities are such that with an increase in noise level the detector output increases negatively, reducing the gain of tubes 26 and 28 to cause a decrease in the noise level at the receiver output. In this manner the receiver noise level at tube 29 is held substantially constant, allowing the maximum allowable amplification of the interrogating pulses at all times without danger of the noise level reaching the critical voltage value producing an undesirable amplifier output triggering the power control circuit 5 and coder 6.

Power control circuit 5 receives the trigger pulses from the receiver where they are applied through lead 7 to the grid 43 of a triode vacuum tube 44. Tube 44 is the normally conducting tube of a conventional multivibrator so that by the application of a trigger pulse to grid 43, multivibrator action is produced in cooperation with tube 45, the normally non-conducting tube of the multivibrator. When tube 45 draws plate current due to multivibrator action, a relay 46 connecting with plate 47 of tube 45 is energized completing a circuit to charge condenser 48 to B+ through the current limiting resistor 49 and bring the grid 50 of a third tube 51 in the power control circuit from beyond cut-off to above cut-off. Tube 51 thereby conducts, energizing relay 52 in the plate circuit which closes switch 53 to connect battery 9 with vibrator power unit 12. Recovery of the multivibrator from the last trigger pulse opens relay 46, discharging condenser 48 to B— through resistors 54 and 55, thereby cutting tube 51 off and de-energizing relay 52 to disconnect power from the beacon coder and transmitter. The time constant of the resistor 54, 55 and condenser 48 network in the grid of tube 51 is chosen so that relay 52 is de-energized after a predetermined length of time. A conventional blanking circuit (not shown) is employed in coder 6 which renders it insensitive to trigger pulses while a code signal is being produced.

The beacon in operation receives interrogating pulses which have been transmitted by a navigation radar unit such as is commonly carried on aircraft. When the pulses are of sufficient strength to overcome the constant noise level bias voltage applied to the last stage of the beacon post-amplifier, trigger pulses will be produced which appear at the receiver output. The trigger pulses turn the beacon coder and transmitter on as previously described to produce the code signal which is radiated into space as electrical microwave energy through the antenna so as to be received by the interrogating navigation radar. The code may represent beacon location or any other desired information.

After the last interrogation pulse has been received, power control circuit 5 actuates switch 53 to disconnect the coder and transmitter from the battery power supply 9. Only the receiver and power control circuit remain operative. When the beacon is again interrogated, the received interrogating pulses are applied to the amplifier to produce trigger pulses which automatically actuate the coder and transmitter as previously described to again generate a code signal.

The automatic gain control and power control circuits in the beacon conserve battery power to insure a long operating life and, at the same time, obtain maximum performance from the receiver under all operating conditions. If temperature conditions are such as to cause a high noise level at the receiver crystal detector, the automatic gain control, in response to the increase in noise level, reduces the receiver gain to prevent the noise level at the receiver output from reaching a value sufficient to produce a trigger pulse. If the temperature conditions are such as to cause a low noise level at the receiver output, the gain of the receiver is automatically increased so that the beacon will respond to weaker interrogating pulses such as those transmitted from greater distances. By maintaining a substantially constant noise level just below the critical value at which the last stage of the post-amplifier will conduct, the maximum communication range of the beacon is obtained at all times.

Though a specific embodiment of the beacon has been shown and described it is to be understood that certain alterations, modifications and substitutions may be made without departing from the spirit and scope of the invention as defined by the appended claims.

I claim:

1. A beacon responsive to interrogating pulses for automatically transmitting information in the form of an electrical signal comprising, a source of power, receiving means including a crystal detector connecting with said source of power and responsive to said interrogating pulses for producing trigger pulses, automatic gain control means connecting with said receiving means for controlling the gain thereof including limiter means responsive to a portion of an intermediate output of said receiver means for limiting said portion to a value slightly greater than noise, means responsive to the output of said limiter means for producing a gain control voltage whose magnitude is dependent only upon the average noise level, and means to apply said control voltage to said receiving means for maintaining a substantially constant noise level at the final output whereby said trigger pulses are produced only in response to said interrogating pulses, signal generating means connecting with said receiving means, power control switching means responsive to said trigger pulses for connecting said signal generating means with said source of power, said signal generating means being responsive to the simultaneous application of a trigger pulse from said receiving means and power from said source to produce an electrical signal, and transmitting means responsive to said signal generating means for transmitting said electrical signal.

2. A beacon responsive to interrogating radar pulse energy for automatically transmitting information in the form of an electrical signal comprising, receiving means, said receiving means including a crystal detector for detecting said interrogating radar pulse energy and producing positive video pulse energy in response thereto, an amplifier connecting with said crystal detector for amplifying said video pulse energy, automatic gain control means connecting with said amplifier for controlling the gain thereof including limiter means responsive to a portion of an intermediate output of said amplifier for limiting said portion to a value slightly greater than noise, means responsive to the output of said limiter means for producing a gain control voltage whose magnitude is dependent only upon the average noise level, and means to apply said control voltage to said amplifier for maintaining a substantially constant noise level at the final output thereof, said amplifier producing trigger pulses only in response to video pulse energy having a signal strength after amplification greater than the noise level signal strength, a power source, a signal generator for producing said electrical signal, switch means responsive to a trigger pulse for connecting said power source with said signal generator whereby an electrical signal is produced, and transmitting means connecting with said signal generator for transmitting said electrical signal in response to said interrogating radar pulse energy.

3. An electronic beacon comprising, a power source, a receiver including a crystal detector for receiving interrogating pulses, transmitting means for transmitting a signal in response to said pulses, switch means responsive to an output from said receiver for connecting said power source with said transmitting means whereby to transmit said signal, and automatic gain control means connecting with said receiver for controlling the gain thereof including limiter means responsive to a portion of an intermediate output of said receiver for limiting said portion to a value slightly greater than noise, means responsive to the output of said limiter means for producing a gain control voltage whose magnitude is dependent only upon the average noise level, and means to apply said control voltage to said receiver for maintaining a substantially constant noise level at the final output thereof whereby only said interrogating pulses will produce a beacon reply.

4. A radar beacon for automatically transmitting electrical signals in response to interrogating pulses comprising, signal transmitting means, receiving means responsive to said interrogating pulses for controlling the operation of said transmitting means, said receiving means including a crystal detector and an amplifier for amplifying the received electrical energy, switch means responsive to the amplified electrical energy for effecting operation of said transmitting means, and automatic gain control means connecting with said amplifier for controlling the gain thereof including limiter means responsive to a portion of an intermediate output of said amplifier for limiting said portion to a value slightly greater than noise, means responsive to the output of said limiter means for producing a gain control voltage whose magnitude is dependent only upon the average noise level, and means to apply said control voltage to said amplifier for maintaining a substantially constant noise level at the final output thereof whereby only interrogating pulses are allowed to pass said amplifier and actuate said switch means.

5. An electronic beacon responsive to interrogating pulse energy for automatically transmitting electrical return signals comprising, receiving means responsive to said interrogating pulse energy, said receiving means including a crystal detector and a multiple stage amplifier for amplifying said interrogating pulse energy, automatic gain control means connecting with said amplifier for controlling the gain thereof including means responsive only to low frequency noise signals at an intermediate stage of said amplifier for producing a control voltage whose magnitude is dependent only upon the average level of said noise signals, and means to apply said control voltage to stages of said amplifier no further than said intermediate stage for maintaining a substantially constant noise level at the last stage of said multiple stage amplifier, said substantially constant noise level being below the critical voltage at which said last stage operates to produce an output whereby only interrogating pulse energy greater than said noise level produces an output from said amplifier, a power supply, a signal generator connecting with said amplifier, switching means automatically connecting said power supply with said signal generator in response to an output from said amplifier whereby to produce a return signal, said switching means including time delay means for automatically disconnecting said signal generator from said power supply for conserving power, and transmitting means connecting with said signal generator and responsive to actuation of said switching means for transmitting said return signal.

6. An electronic beacon responsive to interrogating pulse energy for automatically transmitting electrical return signals comprising, receiving means responsive to said interrogating pulse energy, said receiving means including a crystal detector and a multiple stage amplifier for amplifying said interrogating pulse energy, automatic gain control means connecting with said amplifier for controlling the gain thereof including means responsive only to low frequency noise signals at an intermediate stage of said amplifier for producing a control voltage whose magnitude is dependent only upon the average level of said noise signals, and means to apply said control voltage to stages of said amplifier no further than said intermediate stage for maintaining a substantially constant noise level at the last stage of said mutiple stage amplifier, said substantially constant noise level being below the critical voltage at which said last stage operates to produce an output whereby only interrogating pulse energy greater than said noise level produces an output from said amplifier, and means responsive to said amplifier output for generating return signals.

7. An electronic beacon responsive to interrogating pulse energy for automatically transmitting electrical return signals comprising, receiving means responsive to said interrogating pulse energy, said receiving means including a crystal detector and a multiple stage amplifier for amplifying said interrogating pulse energy, automatic gain control means connecting with said amplifier for controlling the gain thereof including means responsive only to low frequency noise signals at an intermediate stage of said amplifier for producing a control voltage whose magnitude is dependent only upon the average level of said noise signals, and means to apply said control voltage to stages of said amplifier no further than said intermediate stage for maintaining a substantially constant noise level at the last stage of said multiple stage amplifier, said substantially constant noise level being below the critical voltage at which said last stage operates to produce an output whereby only interrogating pulse energy greater than said noise level produces an output from said amplifier, signal generating means, a power supply, and switching means for automatically connecting said power supply with said signal generating means in response to an output from said amplifier whereby to produce a return signal.

8. An electronic beacon responsive to interrogating pulse energy for automatically transmitting information in the form of an electrical return signal comprising, receiving means, said receiving means including a crystal detector for detecting said interrogating pulse energy and producing a positive video pulse voltage in response thereto, a multiple stage amplifier for amplifying said positive video pulse voltage, automatic gain control means connecting with said amplifier for controlling the gain thereof including limiter means responsive to a portion of an intermediate output of said amplifier for limiting said portion to a value slightly greater than noise, means responsive to the output of said limiter means for producing a gain control voltage whose magnitude is dependent only upon the average noise level, and means to apply said control voltage to said amplifier for maintaining a substantially constant noise level at the final output thereof, said substantially constant noise level being below the critical voltage at which said last stage operates whereby only interrogating pulse energy produces an amplifier output, a signal generator connecting with said amplifier and responsive to an output therefrom for producing a return signal, a battery providing a source of electrical potential, switching means automatically connecting said battery with said signal generator in response to an output from said amplifier for energizing said signal generator whereby to produce a return signal, said switching means including time delay means for automatically disconnecting said signal generator from said battery in the absence of an output from said amplifier for conserving power, and transmitting means connecting with said signal generator for transmitting said return signal.

References Cited in the file of this patent

UNITED STATES PATENTS

| | | |
|---|---|---|
| 2,444,426 | Busignies | July 6, 1948 |
| 2,454,415 | Tourshou | Nov. 23, 1948 |
| 2,460,202 | Tyson | Jan. 25, 1949 |
| 2,524,493 | Wood | Oct. 3, 1950 |
| 2,531,412 | Deloraine | Nov. 28, 1950 |
| 2,541,982 | Bernstein | Feb. 20, 1951 |

OTHER REFERENCES

"Radar Beacons" by A. Roberts, vol. 3, M.I.T. Rad. Labs. Series, 1947; McGraw-Hill Book Co., Inc., New York, N.Y.